Jan. 15, 1963

G. W. MORTON 3,073,588

MEMORY JIG

Filed March 2, 1959

5 Sheets-Sheet 1

INVENTOR
GEOFFREY W. MORTON
BY Smart & Biggar
ATTORNEYS

Jan. 15, 1963

G. W. MORTON 3,073,588

MEMORY JIG

Filed March 2, 1959

5 Sheets-Sheet 2

INVENTOR
GEOFFREY W MORTON
BY Smart & Biggar
ATTORNEYS.

Jan. 15, 1963

G. W. MORTON

MEMORY JIG 3,073,588

Filed March 2, 1959

5 Sheets-Sheet 3

INVENTOR
GEOFFREY W. MORTON
BY Smart & Biggar
ATTORNEYS.

INVENTOR
GEOFFREY W. MORTON
BY Smart & Biggar
ATTORNEYS

INVENTOR
GEOFFREY W. MORTON
BY Smart & Biggar
ATTORNEYS.

3,073,588

MEMORY JIG

Geoffrey W. Morton, Almonte, Ontario, Canada, assignor to Her Majesty The Queen in Right of Canada as represented by the Minister of National Defence Filed Mar. 2, 1959, Ser. No. 796,649
2 Claims. (Cl. 269—40)

Figure 1:
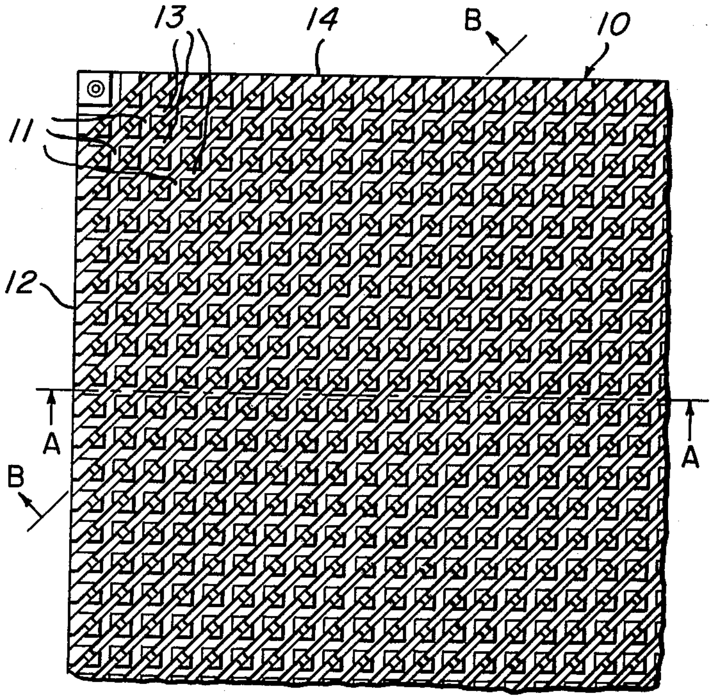

The present invention relates to method and apparatus for manufacturing magnetic core memories.

Magnetic core memories are commonly used in binary digital computers for the storage of information and instructions. These memories consist of a plurality of toroids or cores of ferromagnetic material arranged in planes, each plane having the toroids further arranged in rows and columns. A plurality of conductors are passed through the rows and columns of the memory and are used for inserting and extracting information which is stored in the cores.

The manufacture of magnetic core memories has in the past been a costly and time consuming operation. The cores which are of small size are normally arranged at a density of approximately 10 per inch and are strung on the conductors used for inserting and extracting information from the memory; the number of cores in each row being strung on a series of wires arranged in a rack and the wires running at right angles to these first wires being passed through the appropriate cores. Any further wires such as wires passing diagonally through all the cores of a plane are then threaded through the cores. The most common error in manufacturing these memories is the omission of a wire from a core. The second most common fault in a memory plane constructed in accordance with known practice is a damaged core which does not have the desired magnetic properties.

The present invention provides a method and apparatus for manufacturing a magnetic core memory in a manner which eliminates the possibility of skipping a core when threading the memory and minimizes the chances of damaging a core.

In order to make a plane for a magnetic core memory the present inventor provides a jig comprising a rectangular plate having a plurality of slots in one face thereof. The slots are formed parallel to the sides of the plate and consist of two series of slots at right angles to each other. At each intersection of two slots a pocket is formed in which the magnetic core is placed and is held in upright position for the wiring of the plane. In order to manufacture a memory it is then only necessary to place a core in each pocket and thread the conductors through the cores by passing them along the slots in the jig. In accordance with a further feature of the invention the pockets for holding the cores are positioned so that the plane of the core is at an angle of approximately 45° to each slot.

A pair of jigs constructed according to the invention may be arranged in a frame back to back and after having their pockets filled with cores, have retaining plates arranged over the cores to retain the cores in the pockets. A pair of memory planes can then be manufactured at the same time and wires common to the pair of planes may be made continuous. A plurality of these frames may also be arranged in a suitable assembly and all the planes of a memory wired simultaneously. In this way the number of soldered connections in the memory can be reduced and a consequent increase in reliability obtained.

One of the most time consuming operations is the filling of the memory jig with toroids. When this was done entirely by hand it proved to be both costly and monotonous.

According to a further feature of the invention there is provided apparatus for positioning the magnetic cores in the jig. This apparatus consists of a funnel-shaped container which is adapted to mount the pig in its mouth and is provided with a spout. A core positioning plate is placed over the mouth of the funnel, this plate being provided with a plurality of openings which correspond with the pockets in the jig. A vacuum is applied to the spout of the funnel and a plurality of cores are placed on the positioning plate. The cores are then agitated and are drawn through the openings in the plate and into the pockets in the jig.

Figure 2:
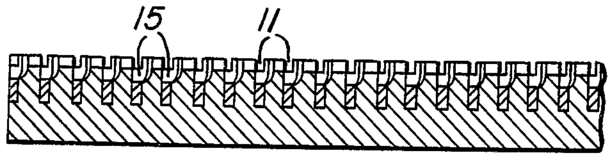
Figure 3:
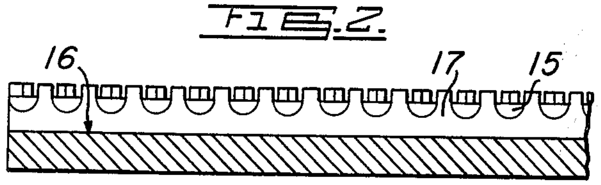
Figures 3, 4:
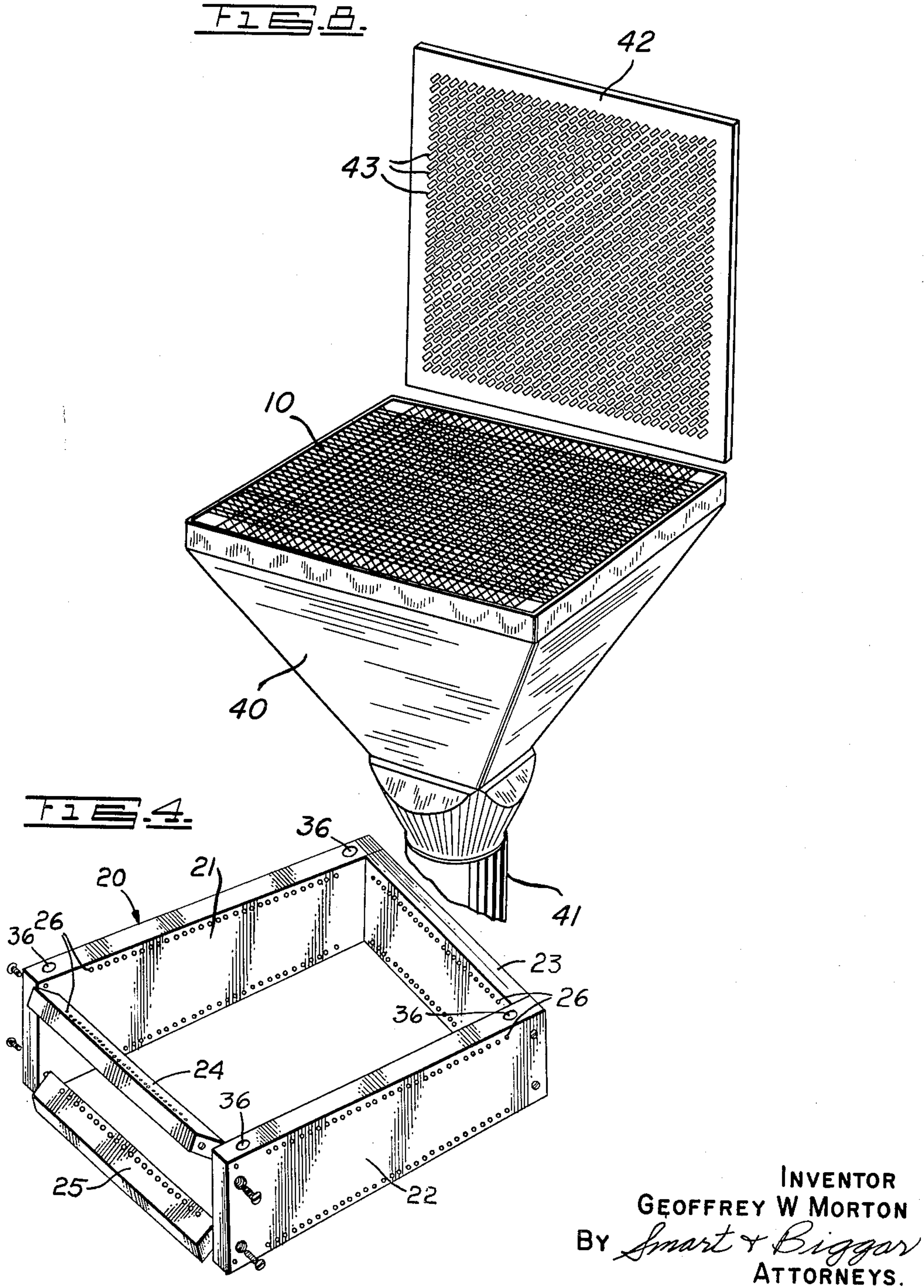
Figure 5:
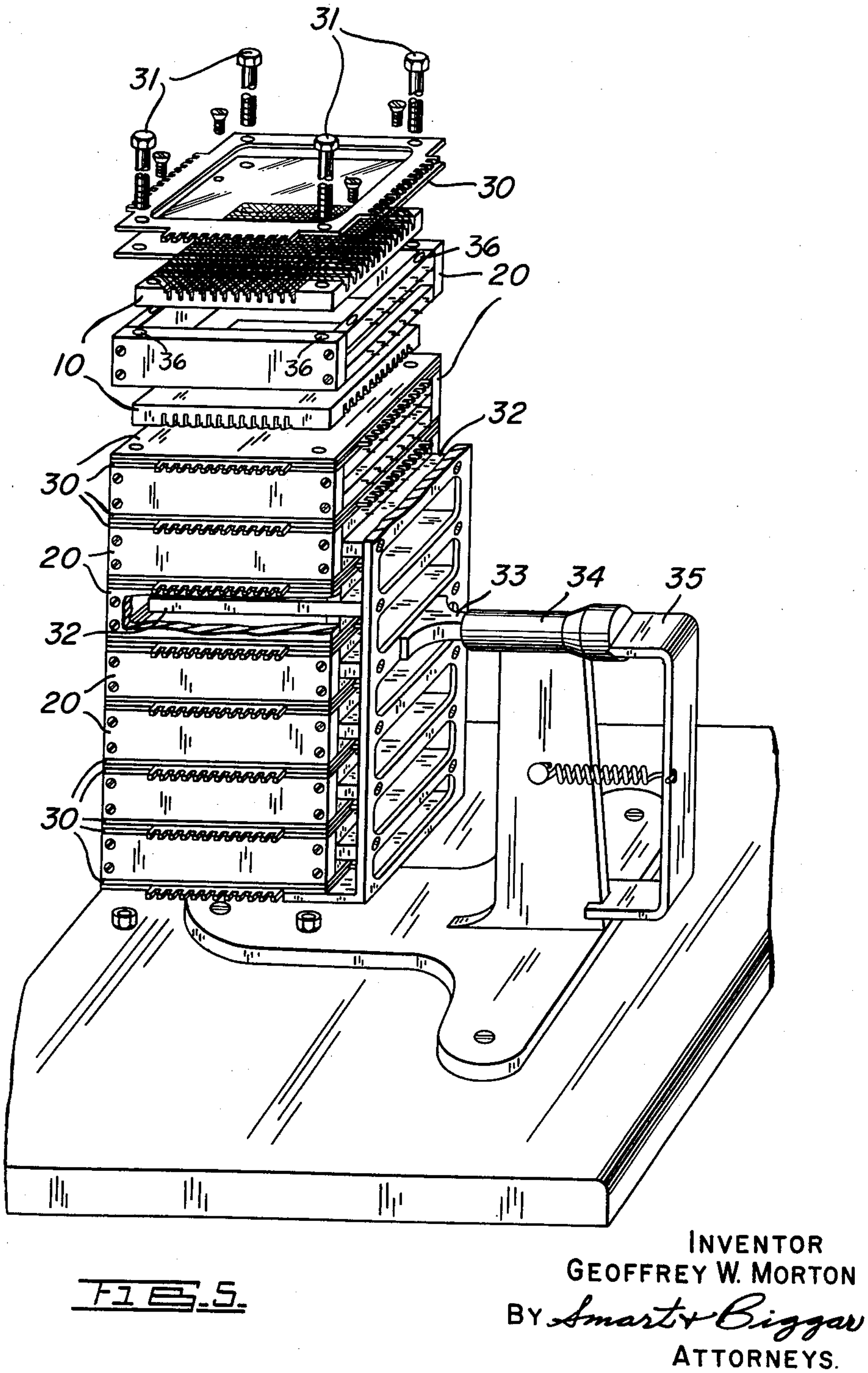
Figure 6:
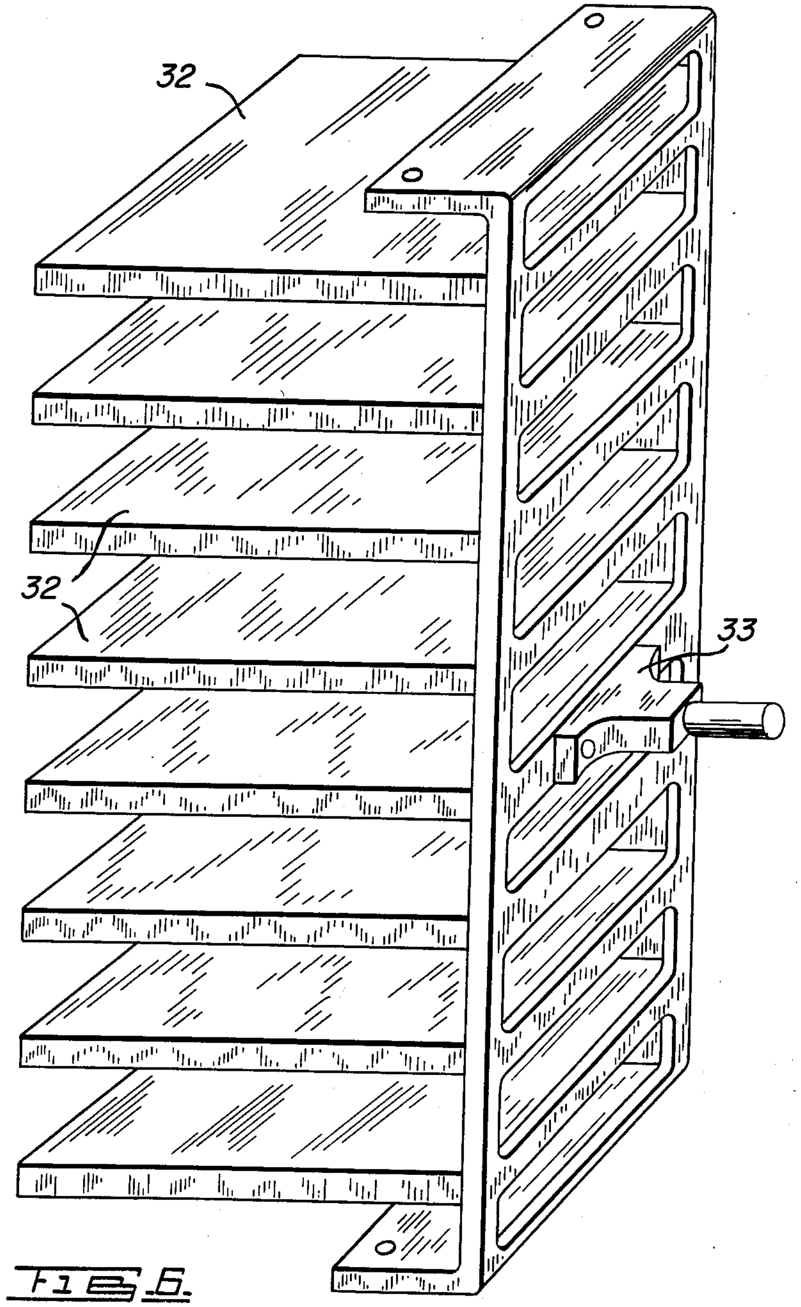
Figure 7:
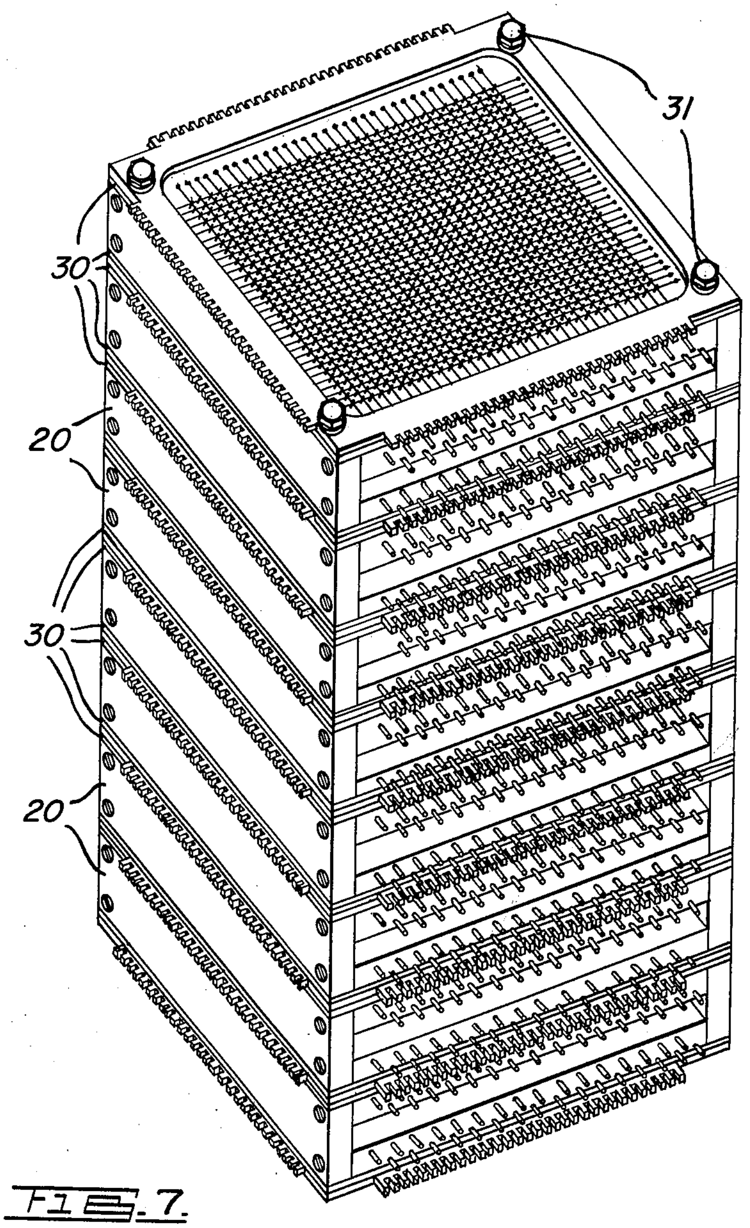

In drawings which illustrate embodiments of the invention,

FIGURE 1 is a partial plan view of a jig constructed according to the invention, FIGURE 2 is a section of the jig along the line A—A, FIGURE 3 is a section along the line B—B, FIGURE 4 is a perspective view of a frame adapted to hold a pair of jigs, FIGURE 5 is an exploded perspective partly in section of an assembly stand for assembling a computer memory, FIGURE 6 is a perspective of a rack used in the assembly stand shown in FIGURE 5, FIGURE 7 is a perspective view of a memory constructed in accordance with the invention, and FIGURE 8 is a perspective view of apparatus used for inserting the cores in the pockets of a jig.

FIGURE 1 shows a rectangular jig 10 which is provided with a first group of slots 11 arranged parallel to the edge 12 thereof and a second group of slots 13 arranged parallel to the edge 14 of the jig, the edge 14 being substantially at right angles to the edge 12. At the intersection of each slot from the group 11 with a slot from the group 13 a pocket is formed which is of semi-circular cross section and is adapted to hold a magnetic core in upright position. The plane of the pockets is arranged at an angle of 45° to the sides 12 and 14 so that a core positioned in the pocket will present the same side to two slots at right angles to one another.

FIGURE 2 is a section through the jig along one of the slots 13 showing the slots 11 extending at right angles to the slots 13 and the pockets 15 formed at the intersections of the slots 11 and 13.

The pockets 15 are formed in the jig 10 by machining diagonal slots 16 as shown in FIGURE 3 into the face of the jig 10. Strips 17 containing the pockets 15 are then inserted in the diagonal slots 16 with the pockets 15 being positioned at the intersections of the slots 11 and 13. The annular core members which are to be wired with the use of this apparatus are supported individualy one in each pocket 15. The slots 16 are machined to a somewhat greater depth than the slots 11 and 13 in order that the pockets 15 formed in the strips 17 will position the cores with their central axis near the bottom of the slots 11 and 13.

The jig illustrated in FIGURE 1 is normally mounted in a frame such as that shown in FIGURE 4 which frame is in turn held in a stand for fabrication of the memory. The frame 20 shown in FIGURE 4 consists of a pair of sides 21 and 22 arranged parallel to one another and spaced apart by a side 23 and a pair of side pieces 24 and 25. These side pieces 24 and 25 are arranged so that they may be removed from the frame. A plurality of frames 20 can be held in stacked relation by bolts 31 passing through holes 36 in the frames. (See FIG. 6.)

A jig according to the invention may be made by machining a piece of brass that had been stress relieved to a size ½ inch larger in both length and width than the outside dimensions of the largest memory plane to be manufactured. This piece of brass then machined down to a thickness of ⅜ of an inch, and two lots of slots at right angles to each other running parallel with the side of the plates are machined for the cores and wires. These slots are .025 inch wide and .065 inch deep and are held to within —0.002 inch in depth and with the centre line of the slots held with + or —.001 inch and the accumulation of errors + or —.001 between the centre lines of any two slots. Slots .031 inch wide and .1875 inch deep are machined on an angle of 45°. This second series of slots is machined into the plates and their accuracy is held to within + or —.001 of an inch.

A quantity of locating strips having the pockets formed therein are made and are a push fit into the diagonal slots of .031 width. When the locating strips are manufactured they are cut into the sizes required and placed into these diagonal slots. The pockets in these locating strips are lined up with centre lines of the milled slots in the plate. These locating strips are held in position by tinning them in place on the outside edge of the memory plate. The final machining to the outside edges of the memory jig is completed after these locating strips have been soldered into position. A small tool is then made up and pressed into each of the pockets in the jig to remove any burrs or sharp edges.

The jig thus manufactured may then be used as a master pattern for moulding a quantity of jigs from suitable moulding materials. Two of these jig plates may be mounted on an assembly frame as shown in FIGURE 4, and spaced apart by a pallet 32 of a stand 33 such as shown in FIGURE 7. The purpose of this is twofold; to hold the two memory jig plates in the correct position in relation to each other, and to enable the person who is wiring the memory planes as much accessibility as possible.

It is desirable that the completely wired assembly be removed from the pallet 32 and the jigs 10.

As shown in FIGURE 4, three sides 21, 22 and 23 of the frame 20 are the actual sides of a double memory plane unit, the fourth side being formed by two pieces 24 and 25. The two side pieces 24 and 25 are made with sufficient gap in between to enable the pallet 32 (shown in FIGURE 6) of the assembly stand 33 to slide out. When the wiring of the memory plane unit is completed the pallet 32 and the two jigs 10 are removed through the space between the side pieces 24 and 25.

Since the pallet 32 and jigs 10 have to slide out of the fourth side of the frame 20 it is impossible to run the wires across this face. The wires may instead be attached to terminals for the purpose of interconnecting one memory plane assembly to another. A series of holes 26 is drilled in all the sides of the frame 20 to enable the wires to be passed through. These holes 26 are drilled so that they line up with the slots 11 and 13 in the main jigs 10. A clear plastic cover 30 is fastened over each jig 10 and keep the cores in their correct position and prevent them from falling out when the frame 20 is rotated. The clear plastic covers enable the person who is wiring the cores to watch what is going on underneath them.

The actual wiring of the jigs may be carried out utilizing a piece of hypodermic tubing as a needle for threading the cores. The hypodermic tubing is of such a size that the wire may be pushed into one end and as the hole in the hypodermic needle is slightly tapered the wire is held in position sufficiently well for wiring purposes. The other end of the needle is filled up and a spherical radius ground onto it. In actual practice this method of wiring the jig proves speedy and quite satisfactory.

In use a pair of jigs 10 having their pockets filled with cores are mounted, with the aid of cover plates 30 and one of the pallets 32 of the stand 33 in a frame 20 with their slotted faces outward. A covering plate 30 (see FIGURE 5) is provided over each jig to prevent the cores from falling out of the pockets when the frame 20 is inverted. The conductors threading the rows and columns of cores are passed along the slots 11 and 13 and threaded through the cores held in the pockets. Advantageously those conductors which are common to both of the planes may be threaded through both planes without a soldered joint connecting the conductors in the two planes.

FIGURE 5 shows a plurality of frames mounted in an assembly stand for wiring a complete memory at one time. To accomplish this the jigs 10 are filled with cores and one jig from each pair of jigs is placed, with the cores facing upward, on the upper surface of each pallet 32 of the stand 33. The frames 20 are each provided with two plastic covers 30, one cover fastened to the upper surface of the frame and the other fastened to the lower surface. These units of a frame covered top and bottom, are stacked on top of each other, with spacers between each unit if desired, and secured in this stack by bolts 31. The members 24 and 25 (see FIGURE 5) of the frames are rotated to widen the opening between these members. The stack of frames is slid on to the stand, with each pallet and the jig lying on the pallet passing through one of these openings. The stand 33 is inverted so that jigs 10 rest, upside down, on the covers 30, the cores being held in by the covers. The stack of frames 20 with the jigs inside is then removed from the stand and the other jig from each pair of jigs is placed, cores upward, on what is now the upper surface of each pallet 32. The stack of frames is once again slid onto the stand with the pallets and the jigs lying on the pallets passing through the openings in the frame. This results in each frame 20 containing a pallet 32 extending in through the opening between the members 24 and 25, with a jig on either side of the pallet, the cores in the jig facing outwardly and maintained in the jig by the covers 30. The members 24 and 25 are then rotated back to their normal positions and fastened there. The assembly stand 33 is mounted on a rotatable mechanism 34 provided with a spring loaded detent 35 which holds the assembly frame 33 in one of two alternative positions.

FIGURE 6 is a perspective of the assembly frame 33 used in FIGURE 5 showing the pallets 32 arranged vertically one above the other.

FIGURE 7 shows a completed memory constructed on the apparatus shown in FIGURE 5. This memory consists of the frames 20 in each of which a pair of planes of magnetic cores is situated. A clear plate 30 protects the cores of each plane from accidental damage.

FIGURE 8 shows an apparatus used for inserting cores in the pockets of a jig 10. A jig 10 is positioned in the open mouth of the funnel 40 which is provided with a spout 41 connected to a source of vacuum. The core positioning plate 42 is positioned over the jig 10. The plate 42 is provided with a plurality of openings 43 which correspond with the pockets 15 (not shown) in the jig 10. In use a plurality of cores are placed on top of the plate 42 and a vacuum is applied to the spout 41. The cores are then agitated and are drawn through the openings 43 in the plate 10 into the pockets 15 in the jig 10.

A quantity of the ferrite cores is poured gently onto the top of the locating plate. It is a relatively simple matter when assisted by air being sucked through the openings to brush the toroids with a small camel hair brush across the plate and get them to fall into the pockets 15 in the memory jig 10 and in a few seconds 90% of the pockets will contain a core. The other 10% of the pockets may either be filled by hand or by brushing a core into the pockets using a light camel haired brush.

What I claim as my invention is:

1. Apparatus for making a magnetic core member in which annular ferromagnetic cores are adapted to be arranged in at least one pair of sets, each said set defining a plane, each said plane being parallel to and spaced apart from the other planes, comprising: a frame for each pair of sets, each frame having an opening, a pair of removable plates for each frame, each plate being dimensioned to pass through said opening, a pallet for each frame dimensioned for insertion through the opening therein whereby said pallet supports said frame and divides said frame into two plate-receiving portions, said removable plates being singly receivable within said portions with one face of each plate facing outwardly of said frame, a pair of covers for each frame, each cover being securable to said frame to cover said one face of each plate, and in conjunction with said pallet, to retain one of the said plates in each said portion said plates being freed for removal from said frame through said opening whenever said pallet has been removed from said opening, a plurality of open pockets adapted to receive the cores in said one face of each plate, said pockets being both in a plurality of parallel rows in one direction and in a plurality of parallel rows in a direction at right angles to said one direction, said pockets being adapted to hold the cores with their axes in parallel relationship with said planes, a plurality of parallel first slots extending across said one face of each plate, each of said first slots intersecting a plurality of rows of pockets and intersecting one pocket in each intersected row; a plurality of parallel second slots extending across said one face of each plate at right angles to said first slots and in the same plane as said first slots, each said second slot intersecting a plurality of rows of pockets and intersecting one pocket in each intersected row.

2. Apparatus as claimed in claim 1 comprising a plurality of pairs of plates, each pair of plates mounted in a frame, the frames being in stacked relationship so that the plates are parallel to each other, said covers being transparent, a rotatable stand having attached to it said pallets in spaced apart parallel relationship adapted to hold said frames, the axis of rotation of said frames being parallel to the planes of said plates, said stand being adapted to lock in two positions, one of said positions corresponding to the upward direction of said one face of one of the plates in said pair of plates, and the other of said positions corresponding to the upward direction of said one face of the other of the plates in said pair of plates.

References Cited in the file of this patent

UNITED STATES PATENTS

| | | |
|---|---|---|
| 146,223 | Bapterosses | Jan. 6, 1874 |
| 2,019,625 | O'Brien | Nov. 5, 1935 |
| 2,029,123 | Stuck | Jan. 28, 1936 |
| 2,111,163 | Yecny | Mar. 15, 1938 |
| 2,712,126 | Rosenberg et al. | June 28, 1955 |
| 2,743,507 | Kornei | May 1, 1956 |
| 2,759,251 | Huyett | Aug. 21, 1956 |
| 2,869,228 | Martin | Jan. 20, 1959 |
| 2,870,531 | Hudson | Jan. 27, 1959 |
| 2,877,540 | Austen | Mar. 17, 1959 |
| 2,943,312 | Von Kummer et al. | June 28, 1960 |
| 2,958,126 | Shaw et al. | Nov. 1, 1960 |
| 2,961,745 | Smith | Nov. 29, 1960 |

FOREIGN PATENTS

| | | |
|---|---|---|
| 800,468 | Great Britain | Aug. 27, 1958 |